UNITED STATES PATENT OFFICE.

ADRIANUS JOHANNES VAN PESKI, OF VLAARDINGEN, NETHERLANDS.

PROCESS FOR THE MANUFACTURE OF ANHYDRIDS OF MONOBASIC ORGANIC CARBOXY-ACIDS.

1,136,630.  Specification of Letters Patent.  Patented Apr. 20, 1915.

No Drawing. Application filed July 30, 1913. Serial No. 781,971.

*To all whom it may concern:*

Be it known that I, ADRIANUS JOHANNES VAN PESKI, technical chemist, and a subject of the Queen of the Netherlands, residing at Vlaardingen, Netherlands, have invented certain new and useful Improvements in Processes for the Manufacture of Anhydrids of Monobasic Organic Carboxy-Acids, of which the following is a specification.

This invention is based on the discovery that by heating the alkali salts or the earthy alkali salts of sulfuric acid-carboxy-acid anhydrids separately, or in the presence of suitable neutral fluids, for instance acetic acid, the corresponding organic acid anhydrid is formed. I have also discovered that by heating a mixture of an alkali salt or an earthy alkali salt of a sulfuric acid-carboxy-acid anhydrid, with an organic acid, and such quantities of an alkali salt or earthy alkali salt of a monobasic organic carboxy-acid as can produce a reaction according to the equation:

there will also be formed an organic acid anhydrid but in quantity double that which is produced in the first case. I have also discovered that simple as well as mixed acid anhydrids may be produced, whose radicals correspond to the acid residues which were contained on the one hand in the salt of the sulfuric acid-carboxy-acid anhydrid, and on the other hand in the salt of the carboxy-acid. When both the acid residues are the same, as for instance when using sodium acetyl-sulfate and sodium acetate, a simple anhydrid is produced namely, acetic acid anhydrid in this example. If, however, the two said residues are different, for instance, when using sodium acetyl-sulfate and sodium propionate, a mixed anhydrid will be the result; in this case acetic acid-propionic acid anhydrid. In most cases the formation of the anhydrids takes place on merely heating the components to the boiling point of the resulting anhydrid, and in other cases, for instance when calcium salts are used, the formation of the anhydrids takes place only after a protracted heating on the reflux cooler. The resulting products of the reaction are then recovered by distillation.

A mixture suitable for carrying out the improved process, of an alkali salt or an earthy alkali salt of a sulfuric acid-carboxy-acid anhydrid with an organic acid may be produced by bringing together sulfuric acid anhydrid or fuming sulfuric acid at temperatures below 0° centigrade with an excess of the corresponding organic acid or with a mixture of the said acid and its anhydrid, and from the resulting mixture of a sulfuric acid-carboxy-anhydrid with a corresponding organic acid, producing the corresponding salt of the sulfuric acid-carboxy-acid anhydrid by mixing the said organic acid with its alkali salt or earthy alkali salt, or another organic acid, likewise at temperatures below 0° C. In this connection it is obvious that the mixture of the sulfuric acid-carboxy-acid anhydrid and the organic acid may have admixed with it immediately as much alkali salt or earthy alkali salt of an organic acid, as is necessary to form not only the salt but also the anhydrid, when the salt is to be further treated according to the improved process.

The following is an example of one way of carrying the improved process into effect:—A mixture of 175 kgs. of the sodium salt of acetyl sulfuric acid and 269 kgs. of acetic acid, acetic acid anhydride and an excess of sodium acetate, which mixture has been produced from 242 kgs. of acetic acid anhydrid containing 42.22% of anhydrid, and 92 kgs. of oleum containing 70% of $SO_3$, and 110 kgs. of sodium acetate is placed into a large stirring vessel containing 100 kgs. of sodium acetate. After the mixture has been well stirred it is heated and also distilled, whereby 342 kgs. of acetic acid anhydrid containing 47.85% of anhydrid are distilled off. The theoretical maximum yield is 51%. A special advantage of the improved process consists in that the resulting anhydrid is perfectly free from chlorin.

Reference is made to my copending application Serial No. 781,970, filed July 30, 1913, for the process for the manufacture of sulfuric acid carboxy-acid anhydrids and their salts.

I claim:

1. A process for the manufacture of anhydrids of monobasic organic carboxy-acids, which consists in heating salts of sulfuric acid-carboxy-acid anhydrids with bases having an alkaline reaction, and then distilling off the acid anhydrid that is formed.

2. A process for the manufacture of anhydrids of monobasic organic carboxy-acids, which consists in heating salts of sulfuric acid-carboxy-acid anhydrids with bases having an alkaline reaction in the presence of neutral liquids, and then distilling off the acid anhydrid that is formed.

3. A process for the manufacture of anhydrids of monobasic organic carboxy-acids, which consists in heating salts of sulfuric acid-carboxy-acid anhydrids with bases having an alkaline reaction, in the presence of a mixture of salts of monobasic organic acids with bases having an alkaline reaction, and of free organic acids and then distilling off the acid anhydrid that is formed.

In testimony whereof I affix my signature in presence of two witnesses.

ADRIANUS JOHANNES van PESKI.

Witnesses:
   G. CHR. vander EB,
   PAUL WYSER.